United States Patent
Tallent et al.

[11] Patent Number: 5,524,870
[45] Date of Patent: Jun. 11, 1996

[54] TORQUE-OVERRIDE WINCH

[75] Inventors: Wallace D. Tallent, Greenfield; Jeffery Griffin, Connersville, both of Ind.

[73] Assignee: Stant Manufacturing Inc., Connersville, Ind.

[21] Appl. No.: 168,021

[22] Filed: Dec. 15, 1993

[51] Int. Cl.⁶ .................. B66D 1/14; F16D 7/04
[52] U.S. Cl. .............. 254/365; 254/323; 464/38
[58] Field of Search ................ 254/365, 323; 464/38, 39

[56] References Cited

U.S. PATENT DOCUMENTS

| | | | |
|---|---|---|---|
| 2,436,418 | 2/1948 | Bradford | 464/46 X |
| 2,560,427 | 7/1951 | Foss | 464/38 |
| 2,561,136 | 7/1951 | Richardson | 464/39 |
| 4,535,973 | 8/1985 | Dorr et al. | 254/323 |
| 4,721,492 | 1/1988 | Maurer | 464/38 |
| 4,889,190 | 12/1989 | Barlage et al. | 464/38 X |
| 4,969,630 | 11/1990 | Denman et al. | 254/323 |
| 5,110,003 | 5/1992 | MacWilliams . | |
| 5,188,341 | 2/1993 | Greaves . | |
| 5,251,877 | 10/1993 | Rempinski et al. | 254/323 |
| 5,314,288 | 5/1994 | Schmidt | 464/39 X |

Primary Examiner—Michael R. Mansen
Attorney, Agent, or Firm—Barnes & Thornburg

[57] ABSTRACT

A winch assembly is provided for use with a torque-override shaft. The winch assembly includes a winch supported on a winch shaft for rotation therewith and a winch housing defining a first chamber for the winch and including a housing wall with an opening to receive the winch shaft. In addition, the winch includes a torque-override apparatus, a shell defining a second chamber for receiving the torque-override apparatus and having a radially-extending peripheral rim, and means for retaining the peripheral rim in fixed engagement with the housing wall so that the shell is prevented from rotating with respect to the winch housing.

13 Claims, 3 Drawing Sheets

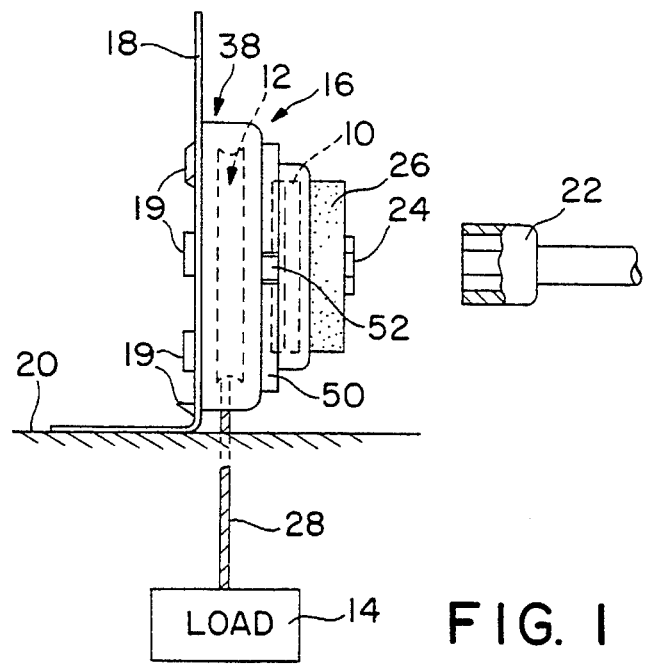
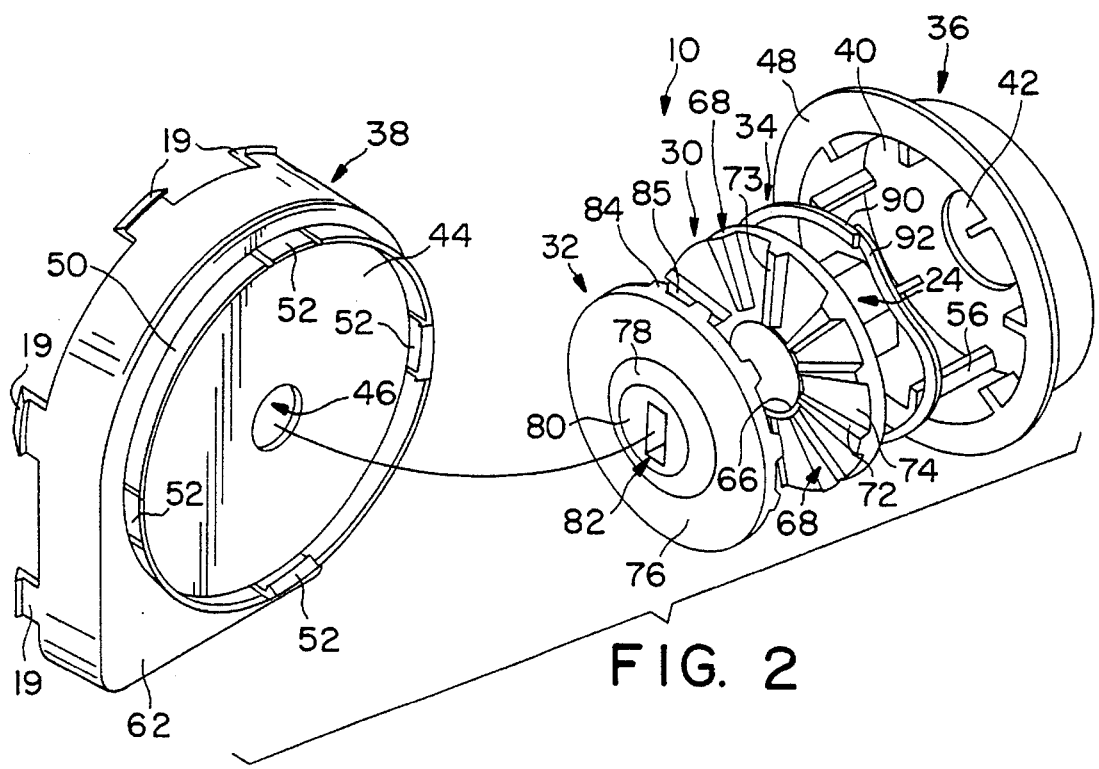

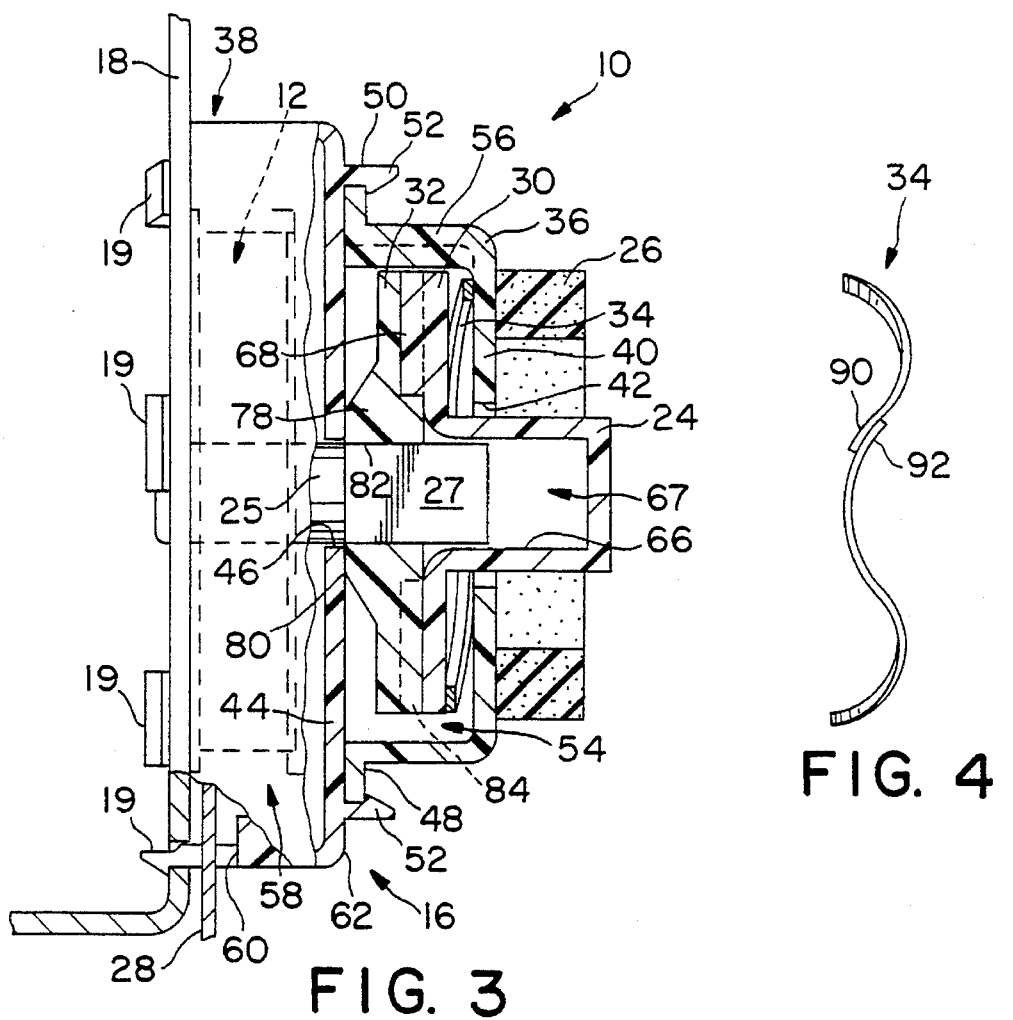
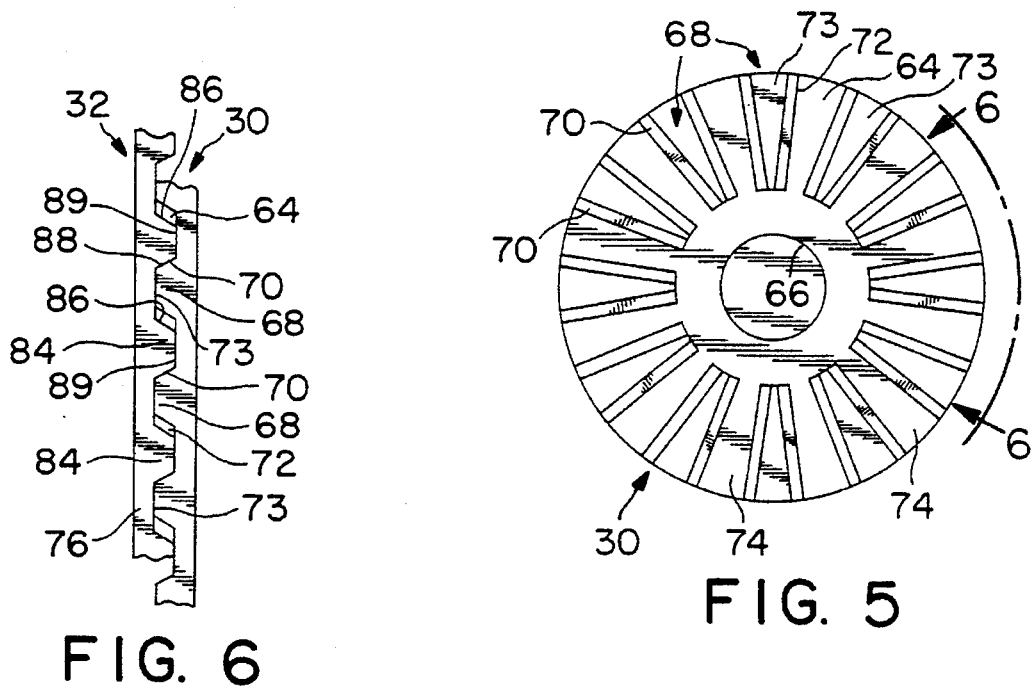

TORQUE-OVERRIDE WINCH

BACKGROUND AND SUMMARY OF THE INVENTION

The present invention relates to a device designed to protect a shaft or the like from exposure to excessive torque. More particularly, the present invention relates to torque-override devices designed to disengage a first shaft portion from a second shaft portion when excessive rotational torque is applied to the shaft. Still more particularly, the present invention relates to a winch assembly with a torque-override shaft.

It is recognized that torque-control mechanisms for rotatable shafts and similar devices are important in extending the lifetimes of such devices. For example, fuel caps may include torque-control mechanisms for preventing users from overtightening the caps. The caps typically include an outer shell and a closure member. The user grips and rotates the outer shell to rotate and advance the closure member in a filler neck or the like. Some devices have used pawl-and-ratchet arrangements in which the pawl disengages from the ratchet when the outer shell of the cap is overtightened, thus disconnecting the outer shell from the closure member. See, for example, U.S. Pat. No. 4,913,303 to Harris. Other devices include a plurality of drive teeth mounted directly on the outer shell for camming engagement with a ratchet wheel or the like including a plurality of driven teeth. Under excessive rotation, the drive teeth disengage from the driven teeth to disconnect the outer shell from the closure member. See, for example, U.S. Pat. No. 5,110,003 to MacWilliams.

Torque-override mechanisms have also been used to prevent users from overstressing rotatable shafts. In a shaft having a crank or other first portion to be rotated by a user and a second portion, the torque-override mechanism may be positioned between the first and second portions to disengage the second portion from the first portion when a user applies excessive rotation to the first portion.

Such a situation might typically arise, for example, in use of a winch assembly. See, for example, U.S. Pat. No. 5,188,341 to Greaves. A winch assembly for raising or lowering a spare tire mounted on the underside of small vans or other comparable vehicles may be particularly susceptible to damage from excessive torque. A mechanic using a torque wrench or other power tool may inadvertently apply excess torque to the winch shaft, stressing or possibly even breaking the shaft. A properly designed torque-override apparatus can remedy this problem. Thus, there is a particular need for a torque-override assembly which can be easily integrated with a winch assembly in a sturdy, reliable system.

According to the present invention, a torque-limited winch assembly is provided. The torque-limited winch assembly includes a winch, a winch housing, a torque-override assembly, a shell for the torque-override assembly, and means for retaining the shell in engagement with the winch housing to provide an integrated assembly. The torque-override assembly includes a drive hub, a driven hub, and a spring biasing the drive hub into torque-limited engagement with the driven hub. The shell includes a radially-extending peripheral rim, and the retaining means retains the peripheral rim in engagement with the wall of the winch housing.

In preferred aspects of the present invention, the retaining means advantageously includes an axially-extending circular flange including a plurality of retaining tabs to engage and retain the peripheral rim. In further preferred aspects of the present invention, the drive hub includes a plurality of drive teeth, each including first and second ramped drive faces, and the driven hub includes a plurality of driven teeth. Each driven tooth includes a first ramped driven face to provide the torque-limited connection for clockwise rotation and a second ramped driven face to provide the torque-limited connection for counterclockwise rotation.

Further according to the present invention, the winch assembly includes a torque-override assembly, a winch, and a housing including a first housing component defining a first chamber for the torque-override assembly and a second housing component defining a second chamber for the winch. The first housing component includes a first cup-shaped wall and a radially-extending circumferential rim. The second housing component includes a second wall and an axially extending circular flange including a plurality of retaining tabs to engage the circumferential rim so that the first housing component is affixed to the second housing component.

Yet further according to the present invention, the winch assembly includes a torque-override assembly, a winch, and a housing including a first housing component defining a first chamber for the torque-override assembly and a second housing component defining a second chamber for the winch. The first housing component includes a first cup-shaped wall and the second housing component includes a second wall. The housing further includes means for fastening the first housing component to the second housing component. In one preferred aspect of the invention, the first fastening means includes a radially-extending circumferential rim. In another preferred aspect of the invention, the second fastening means includes a plurality of retaining tabs to engage the first fastening means.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a schematic view of a torque-override apparatus in accordance with the present invention mounted with a winch assembly for use in raising or lowering a load;

FIG. 2 is an exploded perspective view of an embodiment of a torque-override apparatus in accordance with the present invention;

FIG. 3 is a sectional side view of the apparatus of FIG. 2 showing a drive hub having a plurality of drive teeth engaging driven teeth on a driven hub;

FIG. 4 is an enlarged side view of an undulating spring for use in the torque-override apparatus of FIG. 2 showing separable first and second ends;

FIG. 5 is a top view of a drive hub for use in the torque-override apparatus of FIGS. 2–3 showing the position of the drive teeth; and, FIG. 6 is side elevational view, in layout, taken along lines 6—6 of FIG. 5, showing the drive teeth on drive hub interlocking with the driven teeth on driven hub;

DETAILED DESCRIPTION OF THE DRAWINGS

Figure 7:
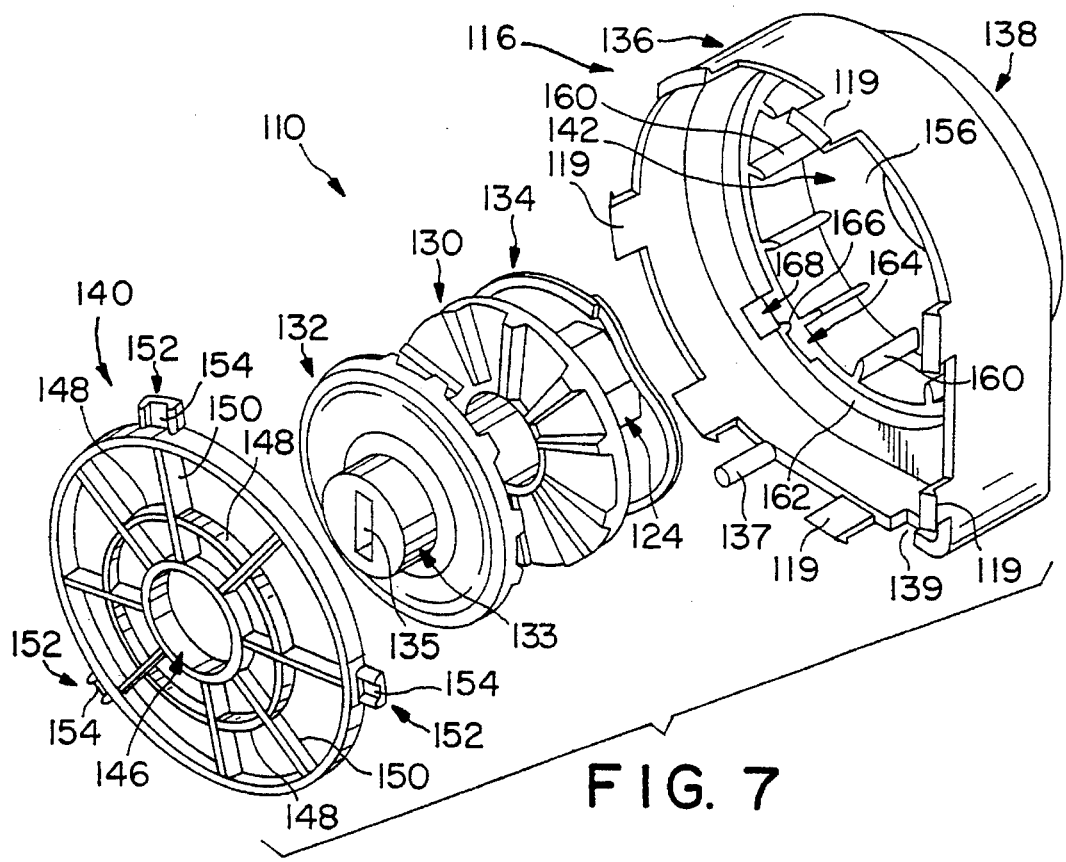
FIG. 7 is an exploded perspective view of another embodiment of a torque-override apparatus in accordance with the present invention; and, FIG. 8 is a sectional side view of the apparatus of FIG. 7 showing a drive hub having a plurality of drive teeth engaging driven teeth on a driven hub.

A torque-override apparatus in accordance with the present invention is suitable for use in a wide variety of systems in which a shaft is to be subjected to rotational torque. As shown in FIG. 1, a torque-limited winch assembly can be provided in which a torque-override apparatus 10 in accordance with the present invention is used in connection with a winch 12 for raising and lowering a load 14. Torque-override apparatus 10 and winch 12 occupy a housing 16 which snaps to a mounting plate 18 or the like by way of a plurality of snaps 19. Mounting plate 18 in turn is welded or otherwise attached to a bracket 20.

Illustratively, bracket 20 may be attached to the underside of a van or other vehicle and load 14 may be a spare tire for the vehicle. A system of this general type is described in U.S. Pat. No. 5,188,341 to Greaves, relevant portions of which are hereby incorporated by reference. The details of winch 12 are well known to those of ordinary skill in the art.

In operating systems of the type illustrated in FIG. 1, a user positions a spare tire tool 22 or other cranking tool in engagement with a drive shaft or first shaft portion 24, shown as a hollow, hexagonal spindle connected to torque-override apparatus 10. A gasket 26 provides a seal against outside air and dust. By rotating tool 22, the user rotates torque-override apparatus 10, and hence rotates winch 12 about a winch shaft or second shaft portion 25 relative to housing 16. Second shaft portion 25 is preferably a double-D winch shaft supporting winch 12 for rotation.

As winch 12 rotates, a cable 28 attached to load 14 coils or uncoils, raising or lowering load 14 between a fully elevated position and a completely lowered position. If the user continues to apply torque, for example, after load 14 has been raised to its fully elevated position, torque-override apparatus 10 will disengage first shaft portion 24 from second shaft portion 25 with an audible clicking noise, preventing the user from applying excess torque.

A torque-limited winch assembly incorporating torque-override apparatus 10 is illustrated in greater detail in FIG. 2. As shown, torque-override apparatus 10 includes a drive hub 30, a driven hub 32, and a spring 34 biasing drive hub 30 into torque-limited engagement with driven hub 32. Advantageously, apparatus 10 provides a torque-limited connection between first shaft portion 24 and second shaft portion 25 (shown, e.g., in FIG. 1) for both clockwise and counterclockwise rotation. Although a variety of materials are suitable for fabricating torque-override apparatus 10, glass-filled nylon or other plastic material is especially preferred as it provides a sturdy, lightweight apparatus.

As shown in FIG. 2, housing 16 includes a winch housing or first housing component 36 and a shell or second housing component 38. First housing component 36 is a generally cup-shaped component including a first wall 40 formed to include an opening 42 through which first shaft portion 24 extends when apparatus 10 is assembled (see, for example, FIG. 3). Likewise, second housing component 38 includes a second wall 44 spaced apart from first wall 40 and formed to include an opening 46 aligned along a common central axis with opening 42. Second shaft portion 25 (shown in FIGS. 1 and 3) extends through opening 46 when apparatus 10 is assembled. Openings 42, 46 need not be of the same diameter.

First housing component 36 includes a radially outwardly-extending peripheral rim 48 providing first fastening means and second housing component 38 includes an axially-extending circular flange 50 with a plurality of retaining tabs 52 providing second fastening means for retaining rim 48 against second wall 44 in snap-fitting engagement. Together, then, rim 48 and tabs 52 cooperate to provide means for fastening first housing component 36 to second housing component 38. In this assembled position, as shown in FIG. 3, rim 48 contacts second wall 44 and a first chamber 54 is defined between second wall 44 and first wall 40 of first housing component 36. Drive hub 30, driven hub 32, and spring 34 are contained in first chamber 54 for rotation relative to housing 16.

First housing component 36 also includes a plurality of radially-inwardly projecting tabs 56 spaced about the periphery of component 36 in first chamber 54. The tabs 56 assist in maintaining drive hub 30 in its proper centered position in first chamber 54.

In cooperation with plate 18, second housing component 38 defines a second chamber 58. Winch 12 (shown in FIG. 3) may be positioned in second chamber 58. A circular guide rib (not shown) may be provided on second wall 44 to assist in maintaining winch 12 in its proper position. In addition, an opening 60 (shown in FIG. 3) is formed in an extended lower portion 62 of second housing component 38 to allow free movement of winch cable 28 therethrough.

Drive hub 30 includes a disk 64 integral with first shaft portion 24. Disk 64 is formed to include an opening 66 accessing an interior region 67 (shown in FIG. 3) defined by first shaft portion 24. Opening 66 and interior region 67 are sized to receive at least a portion of the rectangular end 27 of second shaft portion 25 therein. Rectangular end 27 fits loosely into interior region 67 so that first shaft portion 24 can rotate without engaging and rotating rectangular end 27.

A plurality of drive teeth 68 are positioned in spaced-apart relationship about the circumference of disk 64. Drive teeth 68 are preferably pie-shaped, diverging in the radially-outward direction.

Each drive tooth 68 includes a first ramped drive face 70 for camming engagement with driven hub 32 when first shaft portion 24 is rotated in a clockwise direction. Each drive tooth 68 also includes a second ramped drive face 72 for camming engagement with driven hub 34 when first shaft portion 24 is rotated in a counterclockwise direction. Each drive tooth further includes a pie-shaped top face 73 which is narrow in proximity to the center of drive hub 30 and diverges in the radially outward direction. An interdental pocket 74 is formed between the first ramped face 70 of each drive tooth 68 and the second ramped face 72 of the adjacent drive tooth 68.

The ramp angle of each drive tooth (i.e., the angle between a respective drive face and the disk) may be varied to vary the maximum amount of rotational torque a user can apply. In addition, the ramp angle of first ramped face 70 on a given drive tooth and the ramp angle of second ramped face 72 are equal where the design calls for equal amounts of maximum torque both for clockwise and counterclockwise rotation.

By contrast, a system may be designed to tolerate a given amount of maximum torque in one direction and a different amount in the other direction. To satisfy this requirement, the ramp angles of first ramped face 70 and second ramped face 72 may be varied so that the ramp angle of first ramped face 70 differs from that of second ramped face 72. Advantageously, this design provides for torque-override at a given level for clockwise rotation and torque-override at a different level for counterclockwise rotation.

Driven hub 32 likewise includes a disk 76. A conical portion 78 is formed on the side of disk 76 adjacent to second wall 44. Conical portion 78 includes a flat face 80 formed to include a rectangular opening 82. Rectangular opening 82 is sized to receive the rectangular end 27 of second shaft portion 25 in tight-fitting engagement so that when driven hub 32 is rotated, rectangular end 27 rotates to drive second shaft portion 25. When driven hub 32 is properly assembled with drive hub 30, rectangular opening 82 aligns with circular opening 66.

Driven hub 32 includes a plurality of driven teeth 84. Driven teeth 84 are positioned in spaced-apart relationship on disk 76 so that when drive hub 30 is biased by spring 34 into engagement with driven hub 32, driven teeth 84 are forced into interdental pockets 74 between adjacent drive teeth 68, thus providing the torque-limited connection between first shaft portion 24 and second shaft portion 25. Likewise, driven hub 32 is provided with interdental pockets 85 (see FIG. 2) for receiving drive teeth 68.

Each driven tooth 84 includes a first ramped face 86, a second ramped face 88, and a top face 89 (shown in FIG. 6). Ramp angles for first ramped face 86 and second ramped face 88 may vary, but will be complementary to corresponding ramped faces 70, 72 on drive teeth 68. Thus, drive teeth 68 and driven teeth 84 fit together in interlocking relationship to provide the torque-limited connection.

Those of ordinary skill in the art will appreciate that the illustrated design may be modified to vary the torque-override point of apparatus 10. In general, the level of torque-override is a function of the biasing force exerted on drive hub 30 by spring 34, the ramp angles of ramped faces 70, 72, 86, and 88, and the height of teeth 68, 84. The torque-override point of devices in accordance with the present invention can be modified to suit a wide variety of design specifications.

Spring 34 is preferably an undulating annular spring or "wavy washer." Spring 34 may be a continuous ring. Alternatively, a strip of resilient material having a first end 90 and a second end 92 may be formed into an annulus such that ends 90, 92 overlap but are separable. Spring 34 is positioned between first wall 40 and drive hub 30. Spring 34 may also be positioned between second wall 44 and driven hub 32 to bias driven hub 32 into engagement with drive hub 30.

In the context of a system such as that illustrated in FIG. 1, torque-override apparatus 10 operates as follows. A user positions cranking tool 22 or the like in engagement with first shaft portion 24. The user rotates tool 22, thus rotating first shaft portion 24, in either a clockwise or counterclockwise direction.

Because first shaft portion 24 is integral with drive hub 30, drive hub 30 rotates when the user rotates first shaft portion 24. Drive hub 30 transmits rotational torque to driven hub 32. Specifically, where rotation is clockwise, rotational torque is transmitted to driven hub 32 by the camming engagement of first ramped drive faces 70 on drive teeth 68 with adjacent ramped faces 88 on driven teeth 84. Where rotation is counterclockwise, second ramped drive faces 72 on drive teeth 68 engage second driven faces 86 on driven teeth 84.

Spring 34 acts between first wall 40 and drive hub 30 to bias drive teeth 68 into camming engagement with driven teeth 84. This camming engagement is maintained for levels of torque below the predetermined torque-override point because face 80 on the underside of driven hub 32 engages wall 44 adjacent opening 46. Driven hub 33 thus cannot move out of camming engagement with drive hub 30 at levels of torque below the torque-override point.

Driven hub 32 in turn transmits rotational torque to second shaft portion 25 because rectangular end 27 of second shaft portion 25 extends through opening 82 in tight-fitting engagement with driven hub 32. When second shaft portion 25 rotates, winch 12 in turn rotates, coiling or uncoiling cable 28 to raise or lower load 14, until the user has placed cable 28 in either a fully coiled or a fully uncoiled position.

If the user continues to apply rotational torque to first shaft portion 24 beyond a predetermined maximum level of torque, drive hub 30 will effectively disengage from driven hub 32 to prevent rotational torque from being transmitted to driven hub 32 and thence to second shaft portion 24. As torque is applied beyond the torque-override point, ramped drive face 70 on each respective drive tooth 68 will slip relative to adjacent driven face 88 (assuming clockwise rotation) and spring 34 will be compressed. Each face 70 will "ramp up" each face 88, eventually reaching a position in which the top face 73 of each drive tooth 68 engages the top face 87 of each driven tooth as drive hub 30 and driven hub 32 continue in relative rotation. Spring 34 is under maximum compression when hubs 30, 32 are in this position.

Hubs 30, 32 continue in relative rotation and top face 73 slides out of engagement with top face 89. Drive teeth 30 can then snap into interdental pockets 85 on driven hub 32 with an audible clicking noise, alerting the user that excessive torque has been applied and that rotational torque is no longer being transmitted to second shaft portion 25.

Figure 8:
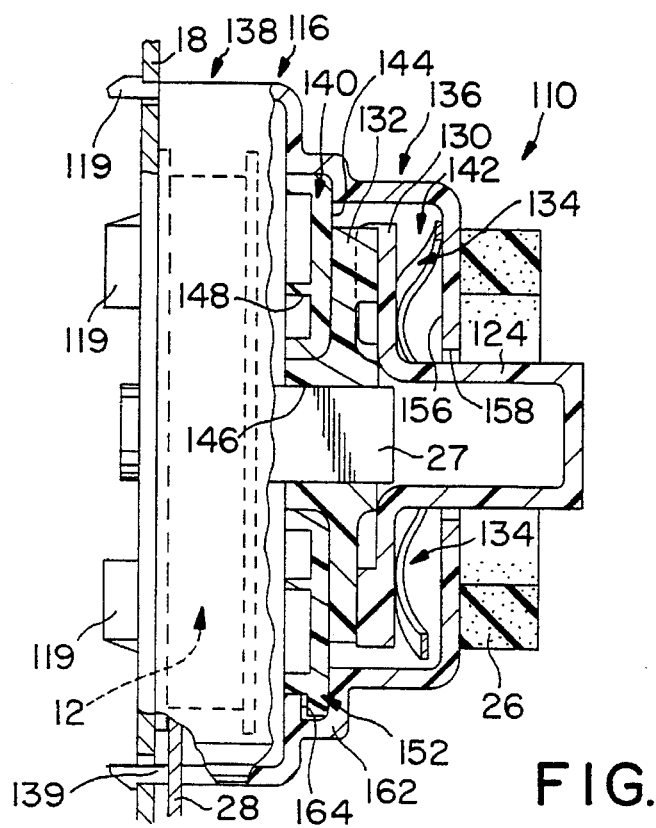

Another embodiment of a torque-limited winch assembly in accordance with the present invention is illustrated in FIGS. 7–8. As shown, a torque-limited winch assembly includes a torque-limited apparatus 110 and a winch 12. Torque-limited apparatus 110 and winch 12 are contained in a housing 116. Housing 116 includes a shell 136 integral with a winch housing 138. A backing plate 140 cooperates with shell 136 and winch housing 138 to define a first chamber 142 for receiving torque-limited apparatus 110.

Winch housing 138 may include a post 137 (shown in FIG. 7) for guiding snaps 119 into plate 18. Winch housing 136 may also be formed to include a slot 139 through which cable 28 extends.

Torque-limited apparatus 110 includes a drive hub 130, a driven hub 132, and a spring 134. Drive hub 130 and driven hub 132 are similar to drive hub 30 and driven hub 32, respectively. Driven hub 132 includes a cylindrical portion 133 on the side of driven hub 132 adjacent to backing plate 140. Cylindrical portion 133 is formed to include a rectangular opening 135 which is sized to receive the rectangular end 27 of second shaft portion 25 in tight-fitting engagement (see FIG. 1).

More particularly, backing plate 140 is a circular disk having a first wall 144 (shown best in FIG. 8). Backing plate 140 is formed to include a central opening 146 sized to accommodate first shaft portion 24 (see FIG. 1). A circular rib 148 and a plurality of radially-extending ribs 150 provide structural rigidity to backing plate 140. Backing plate 140 is also provided with a plurality of tangs 152 each provided with a detent 154 to facilitate engagement with an inner surface of shell 136 as will be subsequently described.

Shell 136 includes a second wall 156 spaced apart from first wall 144 of backing plate 140 when backing plate 140 is assembled with shell 136 as shown in FIG. 8. Chamber 142 is defined between first wall 144 and second wall 156. Second wall 156 is also formed to include a central opening 158 aligned along a common central axis with opening 146.

Shell 136 also includes a plurality of radially-inwardly projecting, circumferentially spaced-apart tabs 160 in chamber 142. Tabs 160 assist in maintaining drive hub 130 in its proper centered position in chamber 142.

A shoulder 162 formed in shell 136 provides means for receiving tangs 152 to lock backing plate 140 in place in engagement with housing 136. Shoulder 162 is formed to include tang-receiving slots 164, each including a lip 166 and an opening 168.

This design allows backing plate 140 to be easily assembled onto shell 136. Tangs 152 of backing plate 140 are positioned in openings 168. Backing plate 140 is then rotated a few degrees to slide the edge of tang 152 past lip 166. When rotation is completed, lip 166 extends into detent 154, thus firmly holding tang 152 in slot 164.

In other respects, apparatus 110 of FIGS. 7–8 is assembled similarly to apparatus 10 of FIGS. 2–6. Likewise, apparatus 110 is operated in the same fashion as is apparatus 10.

Although the invention has been described in detail with reference to certain preferred embodiments, variations and modifications exist within the scope and spirit of the invention as described and defined in the following claims.

We claim:

1. A torque-limited winch assembly comprising a winch supported on a winch shaft for rotation therewith, a first enclosed chamber for housing the winch including a housing wall formed to include an opening to receive the winch shaft, a torque-override apparatus, a second enclosed chamber separated from the first chamber for receiving the torque-override apparatus including a shell having a radially-extending peripheral rim, and means for retaining the peripheral rim in fixed engagement with the housing wall so that the shell is prevented from rotating with respect to the housing wall.

2. The winch assembly of claim 1, wherein there is a backing plate cooperating with the housing wall to define the first chamber for containing the winch and cooperating with the shell to define the second chamber for containing the torque-override apparatus.

3. The winch assembly of claim 2, wherein the means for retaining the peripheral wall includes a two part connector comprising a plurality tangs that each engage within one of a plurality of slots.

4. The winch assembly of claim 3, the housing wall is formed to include the plurality of slots sized to receive the tangs to releasably engage the backing plate with the housing wall.

5. The winch assembly of claim 1, wherein the chambers are defined by a common radially extending wall between the winch and the torque-override apparatus.

6. The winch assembly of claim 5, wherein the first chamber includes an axially extending wall provided with a plurality of mounting tabs positioned for engagement with a mounting plate.

7. The apparatus of claim 1, wherein the shell includes a plurality of radially-inwardly extending tabs arranged in spaced-apart relationship in the second chamber to position the torque-override apparatus in a predetermined position in the second chamber.

8. The winch assembly of claim 1, wherein the retaining means includes an axially-extending circular flange including a plurality of retaining tabs.

9. The winch assembly of claim 8, wherein the first chamber is further defined by a radially-extending circumferential rim and the peripheral rim of the shell includes an axially extending circular flange including a plurality of retaining tabs to engage the circumferential rim.

10. The winch assembly of claim 1, wherein the retaining means includes first fastening means located on the housing wall and second fastening means located on the shell.

11. The winch assembly of claim 10, wherein the first fastening means includes a radially-extending circumferential rim.

12. The winch assembly of claim 10, wherein the second fastening means includes a plurality of retaining tabs to engage the first fastening means.

13. The winch assembly of claim 1, wherein a portion of the housing wall and the shell are integral.

* * * * *